(12) United States Patent
Turner et al.

(10) Patent No.: US 7,440,226 B2
(45) Date of Patent: *Oct. 21, 2008

(54) CARTRIDGE LOADING DEVICES

(75) Inventors: Philip Turner, Bristol (GB); Mark Dillon, Bristol (GB); Andrew Mark Fernihough, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 328 days.

This patent is subject to a terminal disclaimer.

(21) Appl. No.: 11/250,657

(22) Filed: Oct. 14, 2005

(65) Prior Publication Data

US 2006/0103973 A1 May 18, 2006

(30) Foreign Application Priority Data

Oct. 28, 2004 (GB) ................. 0424027.1

(51) Int. Cl.
*G11B 5/008* (2006.01)
*G11B 15/00* (2006.01)

(52) U.S. Cl. ..................................... 360/94; 360/96.51

(58) Field of Classification Search ............... 360/94, 360/96.5, 96.51
See application file for complete search history.

(56) References Cited

U.S. PATENT DOCUMENTS 4,603,362 A  7/1986 Sendelweck

| | | | |
|---|---|---|---|
| 5,558,291 A * | 9/1996 | Anderson et al. | 242/336 |
| 5,793,565 A * | 8/1998 | Suzuki | 360/94 |
| 5,822,149 A * | 10/1998 | Takase et al. | 360/94 |
| 5,923,497 A * | 7/1999 | Suzuki | 360/96.5 |
| 2006/0092554 A1* | 5/2006 | Turner et al. | 360/96.5 |
| 2007/0091502 A1* | 4/2007 | Murase et al. | 360/85 |

FOREIGN PATENT DOCUMENTS

| JP | 09265700 A | * | 10/1997 |
|---|---|---|---|
| JP | 2000306297 A | * | 11/2000 |
| JP | 2003022595 A | * | 1/2003 |

* cited by examiner

*Primary Examiner*—William J Klimowicz

(57) ABSTRACT

A cartridge loading device for magnetic tape cartridges comprises a first member 12, a second member 14, a guide arrangement 30, 32, 36, 38 for guiding movement of the second member relative to the first member from a first position to a second position and a locking system 80, 82, 84 for locking the second member in the first position. A second sized opening is sized to receive second sized magnetic tape cartridges having a predetermined height that is greater than the height of the first sized magnetic tape cartridges. The locking system is arranged to lock the second member in its first position and is actuable by insertion of a second sized cartridge into the first sized opening to release the second member to permit movement from the first position to the second position.

17 Claims, 3 Drawing Sheets

CARTRIDGE LOADING DEVICES

FIELD OF THE INVENTION

The invention relates to cartridge loading devices for magnetic tape cartridges used for storage of digital data.

BACKGROUND TO THE INVENTION

Magnetic tape is commonly used for storage of digital data. The magnetic tape is spooled on reels in a cartridge that is insertable into a digital data transfer apparatus in which data can be written onto the tape and/or data can be read from the tape. Such data transfer apparatus, which may be referred to as a tape drives, typically includes a tape head for one or both of reading and/or writing data from or to the tape head.

Known tape drives are generally designed to use a predetermined size tape cartridge that contains tape having a known width. Known cartridge loading devices of tape drives are generally designed to be used with a particular size of cartridge. Such devices conventionally include means for ensuring that only cartridges of the correct size can be inserted and then only when the cartridge is correctly oriented. A feature of known cartridge loading devices is that they are made rigid so that cartridges of the wrong size or incorrectly oriented cartridges cannot be forced into the tape drive, except by the exertion of an unnatural amount of force.

One format for data storage in a helical scan tape drive is Digital Data Storage (DDS). Various versions of DDS exist, but each version uses the same width tape in Digital Audio (DAT) cartridges, including DAT72 and DAT160. The tape width is approximately 4 mm. There is a demand for more and more data storage capacity. This has, to some extent, been met by improved reading and writing techniques that have allowed increased amounts of data to be stored, without changing the tape length or width. However, ultimately, the storage capacity of a given size of tape has a limit.

One solution to the problem of data storage capacity is to increase the width of the tape. Of course, a greater width provides more storage capacity. However, since the cartridge loading devices of tape drives are designed to accept a particular size cartridge, if wider tapes are used, tape drives with loading devices able to accept a larger cartridge must be provided. This then provides the user with the problem that legacy format tape cartridges would not be usable with the new tape drive and so it would be necessary to maintain more than one tape drive or transfer existing stored data to the wider tape.

Conventional cartridge loading devices that can only accept a single size of cartridge are designed in such a way that cartridges can only be inserted when correctly oriented. To this end, conventional cartridge loading devices are of rigid construction and equipped with means, such as ramps or ribs, that interact with formations on the cartridge to prevent insertion in any but the correct orientation. The result is that an incorrectly oriented cartridge can only be inserted by using an unnaturally large force, usually such as would result in damage to the device and/or cartridge.

The applicant is proposing a new cartridge loading device that can expand in such a way that it can accept different sized cartridges. By this means, a single device can be used with tapes having different widths. In such a cartridge loading device, it remains desirable to have means for preventing the insertion of incorrectly oriented cartridges. However, the conventional means rely on the rigidity of the cartridge loading device.

A further factor affecting the design of cartridge loading devices, and in particular the applicant's proposed expanding cartridge loading device, is the so-called form factor. The form factor determines the size of box, or housing, the tape drive can be housed in if it is to be received in the standard sized compartments and openings to be found in computer equipment and the like. If a cartridge loading device that is expandable to receive larger size cartridges is to be widely used, it must be made such that it can fit into the same size compartments and openings as conventional single size cartridge loading devices.

SUMMARY OF THE INVENTION

The invention provides a cartridge loading device for magnetic tape cartridges, said device comprising a first member, a second member, a guide arrangement for guiding movement of said second member relative to said first member from a first position to a second position and a locking system for locking said second member in said first position, said first and second members cooperating when in said first position to define a first sized opening having a height sized to receive first sized magnetic tape cartridges having a predetermined height and, when in said second position, cooperating to define a second sized opening having a height that is greater than the height of said first sized opening, said second sized opening being sized to receive second sized magnetic tape cartridges having a predetermined height that is greater than the height of said first sized magnetic tape cartridges and said locking system being arranged to lock said second member in said first position and being actuable by insertion of a second sized cartridge into said first sized opening to release said second member to permit movement from said first position to said second position.

The invention includes a cartridge loading device for magnetic tapes comprising housing means defining a housing for magnetic tape cartridges that can expand from a first size to a second size and locking means for locking said housing means in a locked condition in which said housing is said first size, said first size having a first height and said second size having a second height, said second height being greater than said first height, said sizes being selected such that said housing can receive magnetic tape cartridges of two different predetermined sizes for loading into a digital data storage device and said locking means being actuable by insertion of a second sized cartridge into said housing to release said housing means from said locked condition to permit expansion of said housing from said first size to said second size.

BRIEF DESCRIPTION OF THE DRAWINGS

In order that the invention may be well understood, an embodiment thereof, which is given by way of example only, will now be described with reference to the drawings, in which.

DETAILED DESCRIPTION

Figure 1:
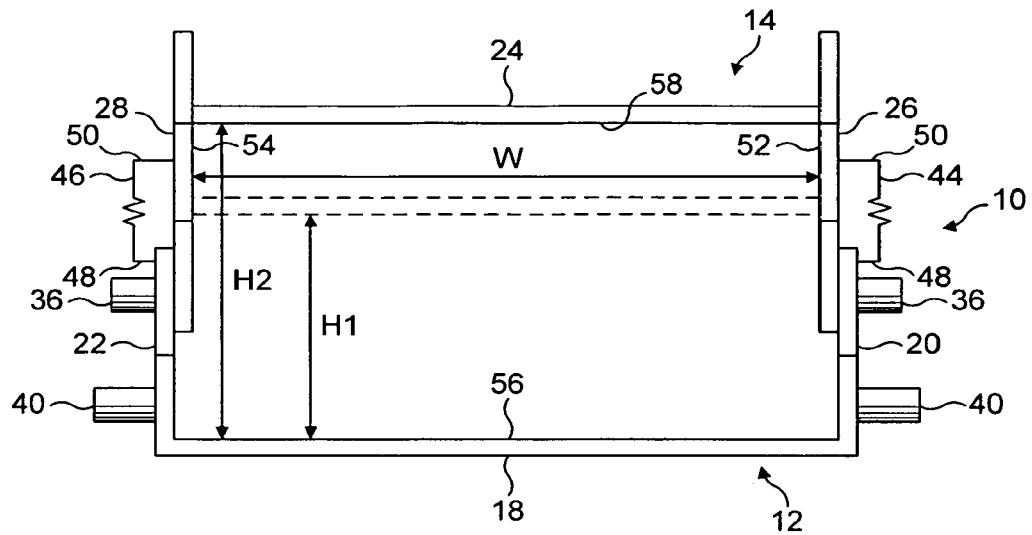
FIG. 1 is a is a front elevation of a cartridge loading device in one condition.

Referring to FIG. 1, a cartridge loading device 10 for magnetic tape cartridges used for storage of digital data comprises a first member 12 and a second member 14. Each member 12, 14 comprises a generally U-shaped channel and the two channels are oppositely disposed so as to define a housing for magnetic tape cartridges that has a substantially rectangular opening 16.

The U-shaped channel of the first member 12 comprises a horizontally disposed base or floor portion 18 and opposed upstanding limbs 20, 22 that extend perpendicular to the base portion 18. The U-shaped channel of the second member 14 comprises a horizontally disposed upper or roof portion 24 and opposed depending limbs 26, 28 that extend perpendicular to the roof portion and parallel to the limbs 20, 22 of the first member 12. The arrangement is such that the limbs 26, 28 of the second member are disposed inside of, and adjacent and parallel to, the respective limbs 20, 22 of the first member 12.

The limbs 20, 22 of the first member 12 are each provided with two elongate slots 30, 32 that are upwardly inclined towards the rear 34 of the cartridge loading device 10. The limbs 26, 28 of the second member 14 are each provided with outwardly projecting pins 36, 38 that project through the respective slots 30, 32 and can slide back and forth in the slots. The slots 30, 32 and pins 36, 38 constitute a guide arrangement that guides movement of the second member 14 relative to the first member 12.

The limbs 20, 22 of the first member 12 are fitted with a set of outwardly projecting pins 40, 42 by which the cartridge loading device 10 is located in a digital data transfer apparatus, or tape drive (not shown).

Figure 2:
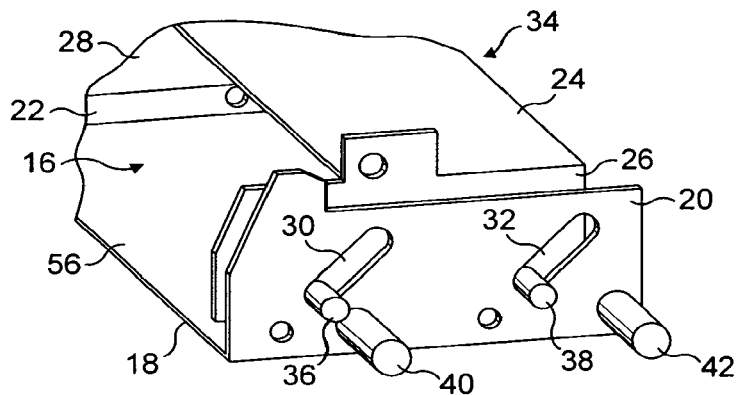
FIG. 2 is a perspective view of the cartridge loading device of FIG. 1 in another condition.

The first and second members 12, 14 are held together in the condition shown in FIG. 2 by a spring biassing arrangement. By way of example, tension springs 44, 46 are shown connected at their ends to respective pins 48, 50 provided on the limbs of the first and second members 12, 14. It is to be understood that the arrangement of springs and pins shown in FIG. 1 is purely schematic. The springs and pins have been omitted from FIGS. 2 and 3 for the sake of clarity. As another alternative, springs might be attached to one or more of the pins 36, 38 and respective attachment portions, such as lugs, on the first member 12. It is also to be understood that other forms of spring biassing can be used and that the biassing of the two members 12, 14 can be achieved by means other than springs.

The normal condition of the cartridge loading device is as shown in FIG. 2. In this condition, the second member 14 is pulled down towards the first member 12 so that the pins 36, 38 are at the lower ends of the respective slots 30, 32. In this condition, and referring to FIG. 1, the opening 16 has a size determined by the distance W between the inner surfaces 52, 54 of the limbs 26, 28 of the second member 14 and the distance H1 between the inner surface 56 of the floor 18 and the inner surface 58 of the roof 24, which for the FIG. 2 condition is shown by dashed lines in FIG. 1. The first sized opening 16 thus described is a relatively narrow opening for cartridges containing a relatively narrow width tape. Typically, the first sized opening might be for a 4 mm tape cartridge.

Figure 3:
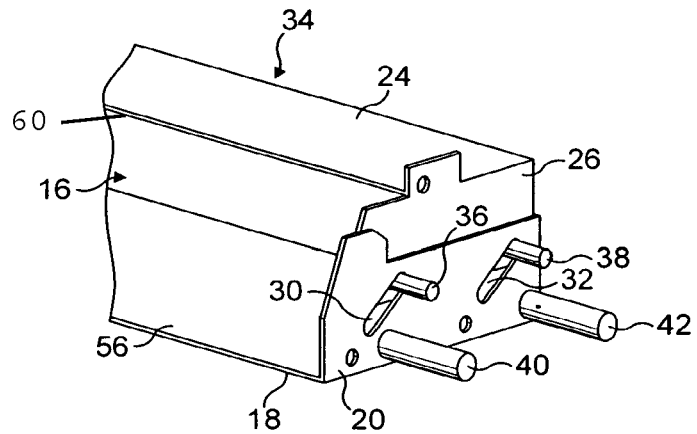
FIG. 3 is a perspective view of the cartridge loading device in the same condition as in FIG. 1.

By virtue of the permitted movement of the second member 14 relative to the first member 12, the size of the opening 16 can be increased to accept a larger cartridge. Typically, the larger cartridge might be an 8 mm tape cartridge. When a larger cartridge is inserted into the opening 16 with the cartridge loading device 10 in the condition shown in FIG. 2, the force applied to the second member 14 pushes the second member upwardly and towards the rear 34 of the device. The movement of the second member relative to the first member is guided by the pins 36, 38 sliding in the slots 30, 32. The guide arrangement is configured such that with the pins 36, 38 at the upper ends of the slots 30, 32 (as shown in FIG. 3), the size of the opening 16 is increased to a second size, just large enough to receive the larger size cartridge. The second size opening has a width W equal to that of the first size opening. However, the height of the opening is increased to H2. The second size opening is thus able to accommodate a larger size cartridge, such as an 8 mm tape cartridge, having a relatively wider tape than the cartridge that can be received in the first size opening.

In the illustrated embodiment, the slots 30, 32 are inclined at an angle of 45° to the horizontal, i.e. to the floor 18. It will be appreciated that the angle of inclination can be varied. However, 45° is preferred, since if the angle is steeper, the force required to move the second member from the position shown in FIG. 2 to the position shown in FIG. 3 is increased, while if the angle of inclination is made less steep, the movement of the second member is made too long.

When a larger size cartridge is removed from the opening 16 of the cartridge loading device 10, the springs 44, 46 pull the second member 14 down towards the floor 18 of the first member. The springs are selected to have sufficient spring force to reliably return the device to the FIG. 2 condition. It will be appreciated that the springs should not be overly stiff, as this would increase the force required to move the second member 14 away from the first member 12 to permit insertion of the larger size cartridge and produce an unnecessarily harsh closing action.

The first and second members 12, 14 are preferably made from a metal, such as steel. Steel components are preferably treated to prevent corrosion.

In order to facilitate the upward movement of the second member 14 relative to the first member 12, it may be desirable to provide an inclined, or ramp-like, lead-in to the opening 16. By way of an example, the leading edge 60 (FIG. 3) of the roof 24 of the second member could be provided with a plastics member, or members, that provide an inclined lead-in to the opening 16. The plastics member(s) might, for example, comprise a body comprising a groove for fitting to the leading edge 60 (preferably the groove would be sized to be a push-fit) with a ramp-like front surface opposite to the side provided with the groove. The inclination of the ramp-like surface would be down towards the floor 18 of the first member and towards the rear of the cartridge loading device 10.

It will be understood that although the embodiment has two members 12, 14 arranged such that the upper of the two moves upwardly with respect to the lower, it is equally possible to have an arrangement in which the lower member moves downwardly with respect to the upper member.

In the embodiment, the slots 30, 32 are straight so that the movement of the second member is along a straight line. However, this is not essential and the slots could instead comprise a curve.

In the embodiment, the guide arrangement comprises pins on one member received in slots in the other member. However, any suitable arrangement may be used. For example, projections received in recesses, a parallel linkage arrangement or a pinion gear running around an arcuate gear segment are all arrangements that could be used.

A locking system provided to assist in preventing the insertion of cartridges that are not correctly oriented by controlling relative movement between the first member 12 and the second member 14 will now be described with reference to FIGS. 4 to 7.

Figure 4:
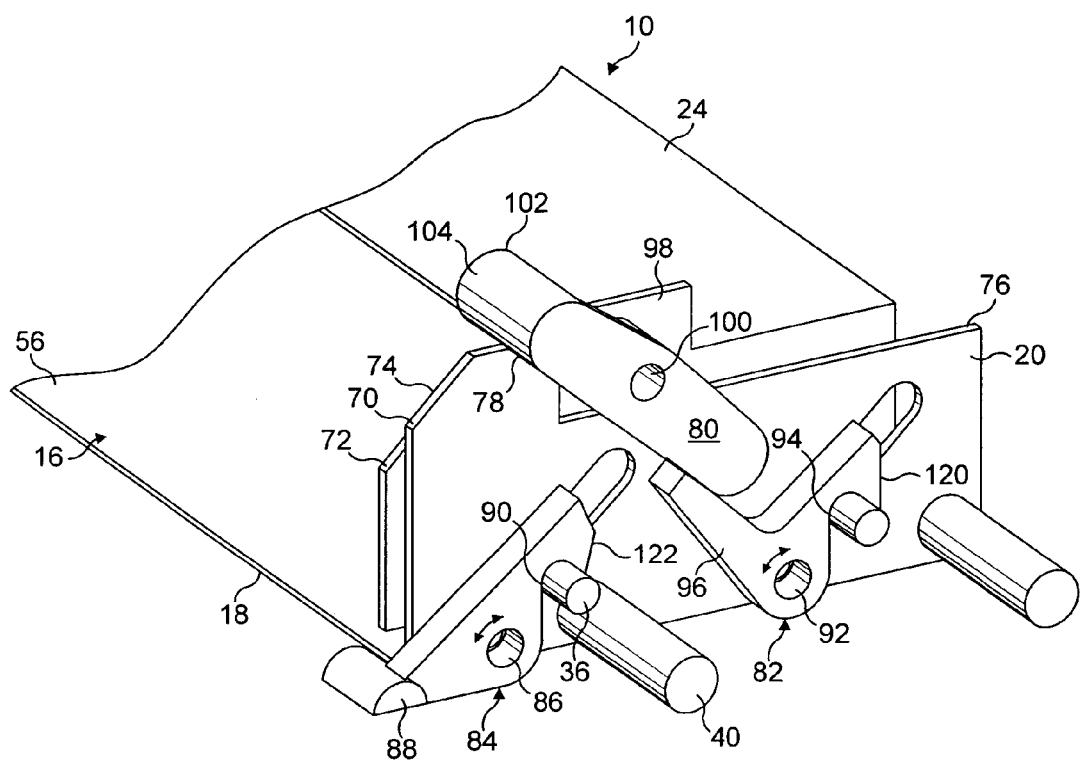
FIG. 4 is a perspective view, corresponding generally to FIG. 2, showing an locking system for the cartridge loading device.

Referring to FIG. 4, the limb 20 of the first member 12 has a bevelled leading edge 70. The limb 26 of the second member 14 has a similar bevel 72. The limbs 22 and 28 have corresponding bevels (not shown). The limb 20 additionally includes a projection, or ear, 74 projecting upwardly of the upper edge 76 of the limb. The rearward side of the ear 74 defines an inclined stop surface 78 that acts as a stop for an actuating member 80, which is a part of the locking system. The locking system additionally comprises a first locking member 82 and a second locking member 84.

The first locking member 82 is pivotally mounted on the limb 20 of the first member 12 at 92. The first locking member 82 comprises a plate that defines a recess, or notch, 94 that is shaped and positioned to engage the pin 38. The configuration of the first locking member is such that it is biassed by gravity to positions in which the recess 94 can engage the pin 38. The first locking member 82 includes an arm 96 that projects upwardly towards the front of the cartridge loading device 10. A rear end portion of the actuating member 80 rests on the free end of the arm 96.

The second locking member 84 is pivotally mounted on the limb 20 at pivot point 86. The second locking member 84 consists of a plate-like portion and a cartridge-engaging portion 88 provided at one end of the plate-like portion. The plate-like portion defines a notch, or recess, 90 that is shaped and positioned to engage the pin 36. The cartridge-engaging portion 88 projects at 90° to the plane of the plate-like portion and beyond the limbs 20, 26 so that it lies in the path of any cartridge that is in the process of being inserted into the opening 16. The configuration of the second locking member 84 is such that it is biassed by gravity to rotate to positions in which the recess 90 can engage the pin 36 and the cartridge-engaging portion 88 is in front of and at least partially above the level of the inner surface 56 of the floor 18 of the first member 12.

The actuating arm 80 is pivotally mounted on an ear 98 that projects upwardly of and is integral with the second member 14. The pivot mounting is intermediate the ends of the actuating member 80 at 100. The actuating member 80 comprises a generally planar portion and a projection 102 at its leading end. The projection 102 extends perpendicular to the plane of the actuating member 80 and inwardly of the ear 98 so that it is disposed above the opening 16. The front surface 104 of the projection is a curved cartridge-engaging surface. The actuating member 80 is configured such that it is biassed by gravity to rotate anticlockwise from the position shown in FIG. 4 and is prevented from rotating anticlockwise by the stop surface 78.

Preferably, the limbs 22, 28 on the opposite side of the device 10 are provided with a corresponding, or similar, locking system (not shown).

The operation of the locking system will now be described with particular reference to FIGS. 5 to 7.

Figure 5:
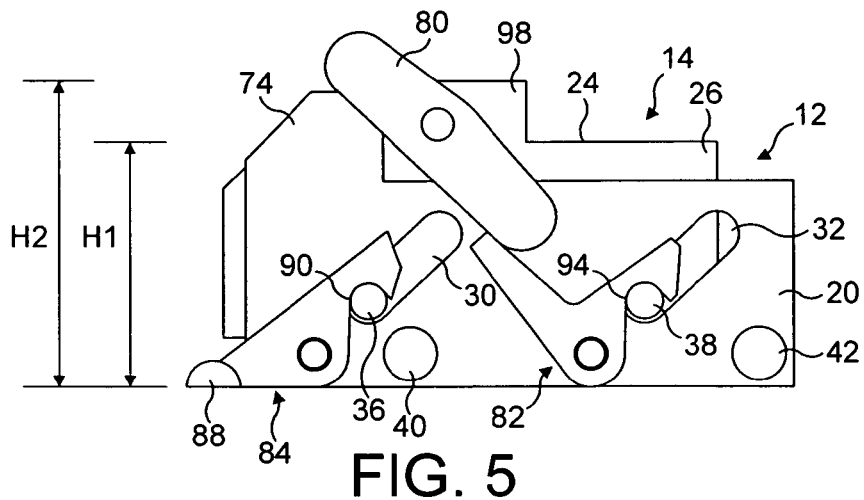
FIG. 5 is a side elevation view of the cartridge loading device as shown in FIG. 4.
Figure 6:
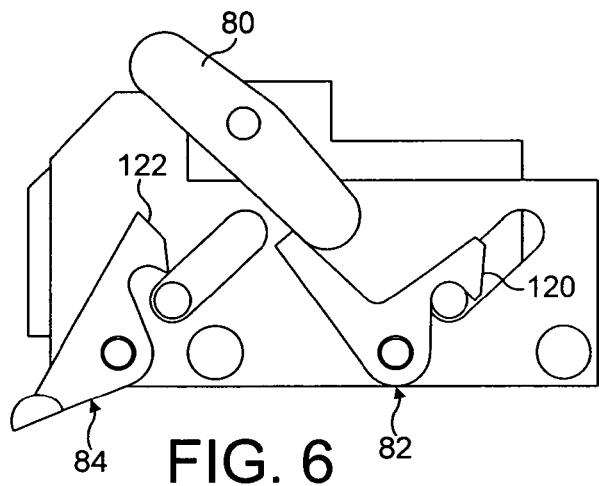
FIG. 6 is a view corresponding to FIG. 5 showing the condition of the locking system after the insertion of a first-sized cartridge (not shown)

FIG. 5 shows the cartridge loading device 10 in the condition in which it is shown in FIG. 4. As shown in FIG. 7, the device 10 is located in a housing, or compartment, having a roof member 110. The housing has an upper door 112 and a lower door 114. A cartridge must be inserted through the doors 112, 114 in order to access the cartridge loading device. As viewed in FIG. 5, the upper door 112 pivots anticlockwise from a closed position to an open position and the lower door 114 pivots clockwise to its open position. The open position of the upper door 112 is defined by a stop 116 that is supported by the roof member 110. Typically the doors 112, 114 are biassed to their respective closed positions by a biassing arrangement (not shown). The biassing arrangement could comprise respective spring members wound around the pivot shafting on which the doors are mounted. However, any suitable known biassing arrangement can be used.

In the condition shown in FIG. 5, the pin 38 is engaged in the recess 94 of the first locking member 82 and the pin 36 is engaged in the recess 90 of the second locking member 84, while the actuating member 80 rests on both the stop surface 78 and the arm 96 of the first locking member 82. In this condition, the pins 36 38 are held at the bottom of the respective slots 30, 32 in such a way that there can be no relative movement between the first and second members 12, 14. In this locked condition, the opening 16 of the cartridge loading device 10 has its first size, with a width W and height H1. A cartridge that is the correct size for the first sized opening and is correctly oriented can be slid past the doors 112, 114 into the opening 16 of the cartridge loading device 10.

As described above, cartridge loading devices are provided with features that interact with the cartridges they are intended to receive to ensure that the cartridges can only be inserted into the device when correctly oriented. At least in part, these measures rely on the rigidity of the cartridge loading device in order to function. For example, ramps may be provided adjacent the opening of the cartridge loading device. If the cartridge is inserted in anything except the correct orientation, the ramps drive the cartridge upwardly or downwardly with respect to the opening and due to the rigidity of the cartridge loading device, the cartridge cannot be forced into the opening. If the cartridge is correctly oriented, the ramps do not act on the cartridge, which can, therefore, slide easily into the opening.

The locking system enables the cartridge loading device 10 to be provided with such features for ensuring the correct orientation of cartridges inserted into the opening 16. FIG. 6 shows how the locking system reacts to the insertion of a cartridge that is the correct size for the first-sized opening having a height H1. As the cartridge enters the opening, its underside (or upperside if the cartridge is inserted the wrong way up) pushes the projection 88 of the second locking member 84 downwards causing the locking member 84 to rotate anticlockwise and releasing the pin 36 from its captive state in the recess 90. However, the pin 38 remains firmly engaged in the recess 94 of the first locking member 84 and so cannot slide in its slot 32. As a result, the position of the second member 14 relative to the first member remains fixed. If the cartridge is inserted in the wrong orientation, the ramps will force the cartridge upwards/downwards and because the first locking member 82 remains engaged with the pin 38, the opening 16 will not change size and so the cartridge will not be able to enter the cartridge loading device.

Figure 7:
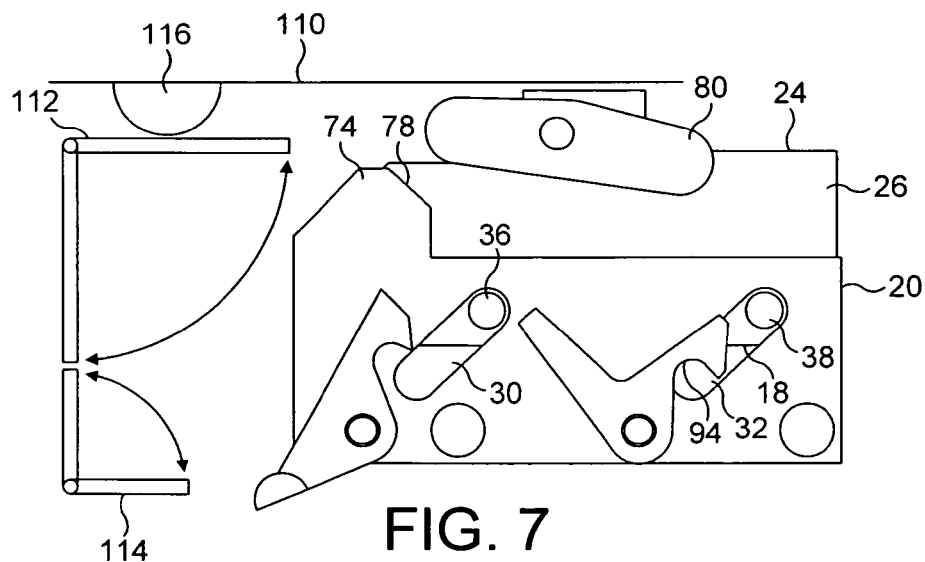
FIG. 7 is a side elevation view of the cartridge loading device showing the condition of the locking system after insertion of a second-sized cartridge (not shown).

FIG. 7 illustrates how the locking system reacts to the insertion of a cartridge that fits into the second sized opening having the height H2. As the cartridge is inserted into the opening 16, it pushes down on the projection 88 of the second locking member 84 causing it to rotate anticlockwise and release the pin 36 from the recess 90. The pin 36 is, thus, free to slide in the slot 30.

Continued insertion of the cartridge results in contact with the curved surface 104 of the projection 102 of the actuating member 80. As the cartridge moves forward, it pushes against the projection 102 causing it to rotate clockwise about its pivot position 100. As the actuating member 80 rotates, it presses down on the arm 96 of the first locking member 82. The downward force acting on the first locking member causes it to rotate anticlockwise and so release the pin 38 from the recess 96. At this stage, both pins 36, 38 are free to slide in their respective slots 30, 32 and the second member 14 is free to move relative to the first member, as described in connection with FIGS. 1 to 3.

Continued insertion of the cartridge forces the second member 14 upwards relative to the first member 12, thus expanding the size of the opening 16 to its maximum height H2, at which the cartridge can be fully inserted into the cartridge loading device 10. Of course, if the cartridge is inserted incorrectly oriented, the features mentioned above will take effect and the cartridge will be forced upwardly or downwardly with respect to the opening 16. Since the maximum height H2 of the opening only just permits insertion of the cartridge and further expansion is prevented by engagement of the pins 36, 38 in the upper ends of the respective slots 30, 32, the incorrectly-oriented cartridge cannot be inserted into the cartridge loading device.

As the second member 14 moves upwardly relative to the first member 12, the projection 102 of the actuating member 80 comes off the top of the cartridge. The gravity bias of the actuating member 80 causes it to rotate anticlockwise. The anticlockwise rotation brings the actuating member 80 back through the position shown in FIG. 5 to an orientation in which the leading end of the actuating member is not as high, relative to its rear end, as when in the FIG. 5 position. The result is that the vertical distance by which the actuating member 80 projects above the second member 14 is reduced to the extent that the ear 98 projects vertically beyond it. This can be seen by comparing the orientation of the actuating member 80 and its position relative to the ear 98 in FIGS. 5 and 7. This provides an important advantage, in that it allows the actuating member to fit under the roof member 110 despite the relative elevation that is a consequence of the upward movement of the second member 14. This is important, because it allows the cartridge loading device 10 to be used in the same size of housing, or compartment as a conventional non-expanding device.

Although not shown in FIG. 7, once the cartridge is fully inserted, the second locking member 84 is able to rotate under the influence of gravity back to the position shown in FIG. 5. Similarly, as the second member 14 moves upwardly to the position shown in FIG. 7, the rear end of the actuating member 80 loses contact with the arm 96 of the first locking member 82, which then rotates under the influence of gravity to the FIG. 5 position.

When a relatively larger cartridge is removed from the cartridge loading device 10, the second member 14, the springs 44, 46 (FIG. 1) pull the second member 14 from the position shown in FIG. 7 to the position shown in FIG. 5. The first and second locking members 82, 84 have respective cam faces 120, 122 that are configured such that as the pins 36, 38 move back down the slots 30, 32, they engage the cam faces and cause the locking members to rotate anticlockwise to permit the pins to return to the lowermost ends of the slots. Once the pins 36, 38 have reached the ends of the slots, the locking members 82, 84 rotate clockwise under the influence of gravity in order to bring the pins 36, 38 into engagement with the respective recesses 90, 94, thereby returning the cartridge loading device to the condition shown in FIG. 5.

It will be appreciated that the locking system allows for the provision of an expandable cartridge loading device that can expand from a first size to a second size and still retain the necessary rigidity to permit the functioning of features that prevent the insertion of incorrectly oriented cartridges. The arrangement of the actuating member 80 and locking member 82, 84 is such that the first and second locking members are progressively released by insertion of a correctly oriented and second sized cartridge into the opening 16. Similarly, the members of the locking system are returned to their locking positions simply by the influence of gravity when the cartridge is removed. Thus, the locking system is actuated by normal insertion and removal of a correctly sized cartridge without the provision of a drive device allowing the possibility of grater reliability and economic manufacture.

In the embodiment, the locking members 82, 84 are biassed by gravity alone to the positions in which they engage the pins 36, 38. That is, the configuration of the locking members 82, 84 and their respective pivot positions 86, 92 is such that without some other external influence, the locking members will tend to rotate to the positions shown in FIG. 4. Similarly, the actuating member 80 is configured and pivotted so that gravity will cause it to rotate to the FIG. 7 position. However, it will be understood that this is not essential. Some, or all, of these parts may be urged to those positions by other means, such as a spring biassing arrangement.

As previously indicated, it is preferred that both sides of the cartridge loading device 10 are provided with a locking system such as is shown in FIGS. 4 to 7. However, it is envisaged that a locking system on just one side may be sufficient.

The locking system as shown has a first and second, or front and rear, locking member and, although that is the presently preferred arrangement, it is envisaged that the front locking member 84 could be dispensed with.

In the embodiments, the projections 88 and 102 are integral parts of the second locking member 82 and the actuating member 80 respectively. This is not essential. One, or both, projections could take the form of rollers mounted on an axle projecting from the respective member.

As shown, the stop surface 78 for the actuating member 80 is defined by a portion of the limb 20. Although this arrangement is to be preferred for simplicity, the stop surface could, instead, be defined by a separate part fixed to the first member 12 or a housing in which the cartridge loading device is housed.

In the embodiment, when the second member 14 has moved to its second position, the actuating member 80 has moved to a position in which it is entirely below the uppermost extent of the second member 14, which is the top edge of the ear 98. While this arrangement is preferred, it is not essential. Advantage can be obtained if the actuating member moves, or is moved, to a position in which the vertical distance it projects beyond the second member is reduced as compared with the vertical distance it projects beyond the second member when it is resting on the stop surface 78 and/or acting on the first locking member 82. It will also be appreciated that it is the vertical projection distance that is important in order to obtain the advantage. This does not preclude the possibility of the actuating member projecting beyond the first and/or second members 12, 14, if this is required.

In referring to the height H1, H2 of the first and second sized openings, it is to be understood that this does not have to be uniform across the width of the opening. The height is the distance between a portion of the first member and an opposed portion of the second member that controls whether a cartridge which the opening is intended to receive can actually be received. The height might be the spacing between two plane surfaces as shown in FIG. 1 However, as an example of an alternative arrangement, the roof portion 24 might be provided with one or more projections facing the floor portion 18 and it would be the distance between the projection, or projections, and the floor portion that would represent the height and determine the height of cartridge that could be received in the opening.

As an alternative to the ramps described above, it will be understood that the first member 12 and second member 14 can be provided with ribs or grooves configured to mate with ribs or grooves on a cartridge that are arranged to ensure that the cartridge is inserted in the correct orientation. For example, a rib, or projection, might be provided on the floor portion 18 to one side of the centreline of the opening 18. This would be positioned such that provided the cartridges the opening is intended to receive are correctly oriented when inserted into the opening, the rib will be received in a groove, or recess, in the cartridge. As is known, such an arrangement can ensure that cartridges can only be inserted into the opening when correctly oriented. As with the system of ramps described above, it will be appreciated that when a cartridge that is the correct size for the first size opening is inserted into the cartridge loading device in an incorrect orientation, the first locking member 82 will continue to engage the pin 38, so preventing movement of the second member 14 relative to the first member 12. Thus, the second member 14 cannot be forced upwardly in such a way as to override the function of the rib/groove arrangement.

The invention claimed is:

1. A cartridge loading device for magnetic tape cartridges, said device comprising a first member, a second member, a guide arrangement for guiding movement of said second member relative to said first member from a first position to a second position and a locking system for locking said second member in said first position, said first and second members cooperating when in said first position to define a first sized opening having a height sized to receive first sized magnetic tape cartridges having a predetermined height and, when in said second position, cooperating to define a second sized opening having a height that is greater than the height of said first sized opening, said second sized opening being sized to receive second sized magnetic tape cartridges having a predetermined height that is greater than the height of said first sized magnetic tape cartridges and said locking system being arranged to lock said second member in said first position and being actuable by insertion of a second sized cartridge into said first sized opening to release said second member to permit movement from said first position to said second position, wherein:

said locking system comprises a movable locking member carried by one of said first and second members and having a locking position in which it engages a formation carried by the other one of said first and second members; and said locking system comprises an actuating member for receiving a force applied by said insertion of a second sized cartridge into said first sized opening and applying said force to said locking member to cause said locking member to move to a release position so as to provide said release of the second member.

2. A device as claimed in claim 1, wherein said actuating member is carried by said other one of the first and second members.

3. A device as claimed in claim 2, wherein said locking member is carried by said first member and said actuating member is carried by said second member.

4. A device as claimed in claim 3, wherein said guide arrangement comprises at least one slot provided in said first member and a respective projection received in said at least one slot and carried by said second member, said formation engaged by said locking member being engaged with the respective projection.

5. A device as claimed in claim 3, wherein when said second member is in said first position and said locking member is in said locking position, said actuating member is in a first position in which at least a portion thereof projects beyond said second member a first vertical distance, and when said second member is in said second position, said actuating member is in a second position in which said at least a portion thereof projects beyond said second member a second vertical distance that is less than said first vertical distance.

6. A device as claimed in claim 5, wherein said actuating member is biassed to said second position.

7. A device as claimed in claim 6, wherein said actuating member is biassed to said second position by gravity.

8. A device as claimed in claim 3, wherein when said second member is in said first position and said locking member is in said locking position, said actuating member is in a first position in which at least a portion thereof projects beyond said second member a vertical distance and when said second member is in said second position, said actuating member is in a second position in which said at least a portion does not project vertically beyond said second member.

9. A device as claimed in claim 1, wherein said locking member is biassed to said locking position.

10. A device as claimed in claim 9, wherein said locking member is biassed to said locking position by gravity.

11. A device as claimed in claim 1, wherein said locking system comprises a second locking member carried by one of said first and second members and having a locking position in which it engages a formation carried by the other one of said first and second members, said second locking member being connected with a part projecting across said opening so as to be movable by a cartridge inserted into said opening whereby a force is applied to said locking member to move said locking member to a release position.

12. A device as claimed in claim 11, wherein said locking members are carried by the same one of said first and second members.

13. A device as claimed in claim 1, comprising two said locking systems oppositely disposed on respective sides of said device.

14. A digital data transfer apparatus comprising a cartridge loading device for magnetic tape cartridges as claimed claim 1.

15. A cartridge loading device for magnetic tapes comprising housing means defining a housing for magnetic tape cartridges that can expand from a first size to a second size and locking means for locking said housing means in a locked condition in which said housing is said first size, said first size having a first height and said second size having a second height, said second height being greater than said first height, said sizes being selected such that said housing can receive magnetic tape cartridges of two different predetermined sizes for loading into a digital data storage device and said locking means being actuable by insertion of a second sized cartridge into said housing to release said housing means from said locked condition to permit expansion of said housing from said first size to said second size, wherein:

said housing means comprises a first housing portion and a second housing portion, relative movement between said housing portions provides said expansion from said first size to said second size, and said locking means comprises a first engaging means carried by said first housing portion and a second engaging means carried by said second housing portion, said first engaging means engaging said second engaging means to lock said housing means in said locked condition; and said locking means further comprises actuating means engageable by said second sized cartridge inserted into said housing for transmitting a force generated by said insertion of said cartridge to one of said first and second engaging means for moving said one of said first and second engaging means out of engagement with the other one of said first and second engaging means to release said housing means from said locked condition.

16. A device as claimed in claim 15, wherein said actuating means has a first position when said housing is said first size in which at least a portion of said actuating means projects a vertical distance beyond said housing means and a second position when said housing is said second size in which said vertical distance is at least less than when said actuating means is in said first position.

17. A device as claimed in claim 16, wherein said actuating means is biassed to said second position.

* * * * *